United States Patent Office 3,040,246
Patented June 19, 1962

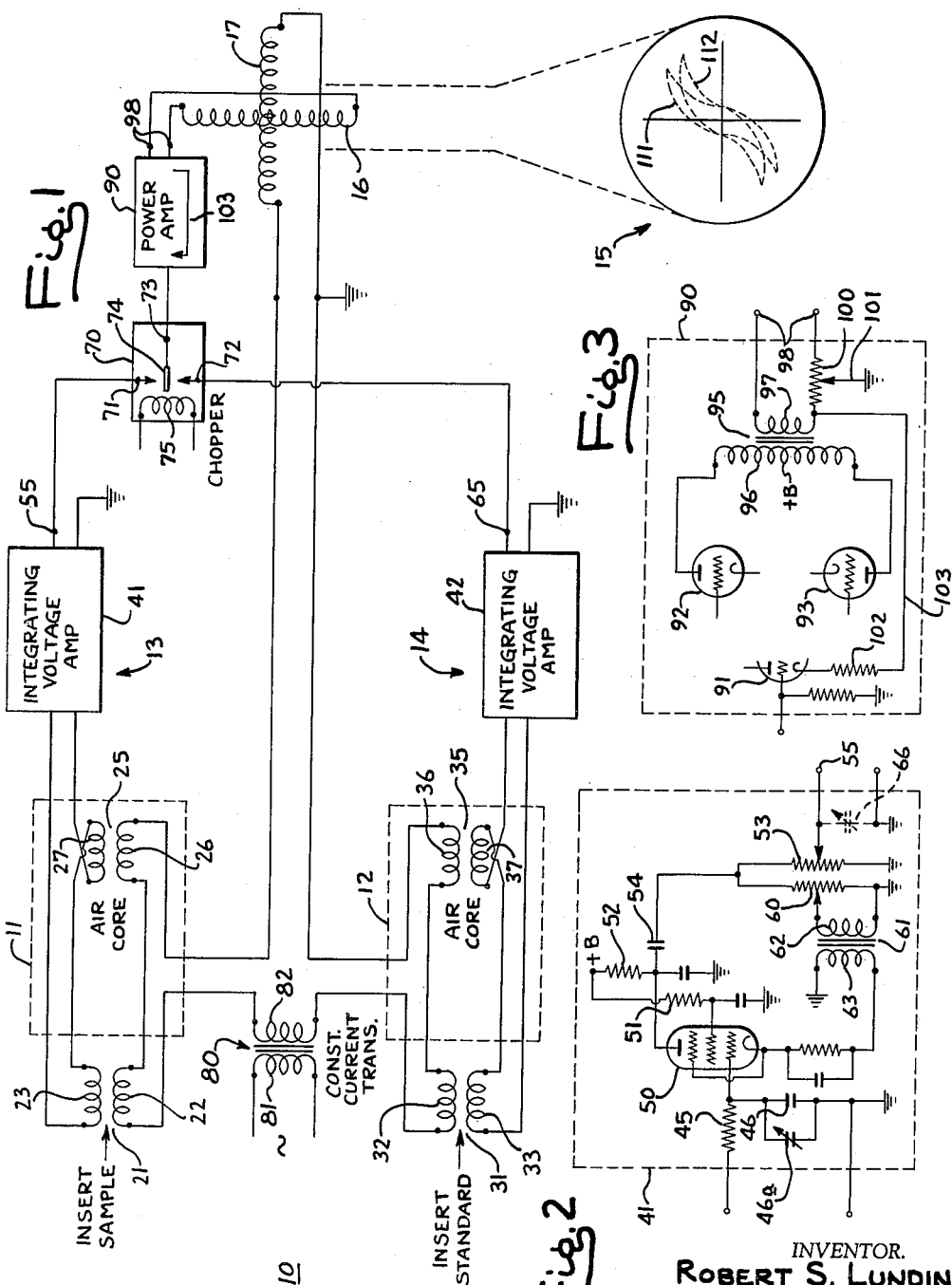

3,040,246
DEVICE FOR COMPARING AND DISPLAYING
HYSTERESIS CHARACTERISTICS
Robert S. Lundin, Thomaston, Conn., assignor to General Time Corporation, New York, N.Y., a corporation of Delaware
Filed Jan. 7, 1959, Ser. No. 785,517
7 Claims. (Cl. 324—34)

The present invention relates to magnetic testing devices and more particularly to an arrangement for comparative display of the hysteresis characteristics of two magnetic materials or elements.

A.-C. timing motors of the type employed in electric wall clocks, alarm clocks, and the like include provision for setting up a rotating A.-C. field for the driving of a magnetic rotor at synchronous speed and with sufficient torque to overcome the friction of the driving train. In some timing devices the motor, in addition to driving the train of gears, must also perform useful work such as the operating of switches, latching of mechanical elements, the winding of springs, and the like. Since timing devices are expected to be absolutely reliable in operation, the achieving of synchronous operation combined with adequate torque has required careful control of the magnetic characteristics of the rotor, particularly control of the hysteresis characteristic.

Consequently, it is an object of the present invention to provide a hysteresis displaying and comparing device whereby the hysteresis characteristic of a production line sample may be easily and quickly compared to the hysteresis characteristic of a standard unit known to be satisfactory.

It is another object of the present invention to provide a display and comparing device which is reliable and accurate in operation and which gives quantitative as well as qualitative data in visible form whereby the characteristics of a sample may be evaluated at a glance. In this connection, it is an object of the present invention to provide a device of the above type which may be employed right on the production line and operated by relatively untrained personnel with only a minimum of instruction.

It is an object to provide a device which is ideally suited to rapid test-sampling of magnetic pieces on a production line with, say, one piece in every hundred being tested, or with sampling in any other ratio as may be necessary to maintain a desired degree of quality control. It is a relative object to provide a device for display of magnetic characteristics which is inherently stable and which is capable of retaining its calibration and accuracy for long periods of time on a typical factory production line.

It is a further object of the invention to provide a hysteresis testing device in which the magnetic element to be tested may be of any size without any substantial effect upon accuracy and which gives accurate quantitative results in accordance with the cross sectional area of the sample. In this connection, it is an object to provide a hysteresis testing device which is capable of accepting a sample of any shape and without necessity that the sample be in the form of a closed magnetic loop, making it possible to use either a production part or a single slug of the material to be tested. It is an object of the invention, more specifically, to provide a hysteresis measuring device in which two air core transformers are employed in a novel bucking relation to cancel out the effect of magnetic flux passing through the air between the windings so that when a magnetic element is inserted into the magnetic circuit of one of the transformers, the resulting output is an accurate measure of the magnetic characteristics of the element.

It is still another object of the invention to provide a device for display of a hysteresis characteristic in the form of a cathode ray tube having deflection coils and which includes novel provision for eliminating undesirable phase shift effects resulting from the inductance of the deflection coils.

Other objects and advantages of the invention become apparent upon reference to the attached detailed description and upon reference to the drawing in which:

FIGURE 1 is a schematic electrical diagram of a display device embodying the present invention;

FIG. 2 is a schematic diagram of an integrating arrangement used in the circuit of FIG. 1; and FIG. 3 is a partial schematic of a power amplifier which may be used in the circuit of FIG. 1 and showing the current feedback means.

While the invention has been described in connection with a preferred embodiment, it will be understood that I do not intend to be limited to such embodiment but, on the contrary, intend to cover the various alternative and equivalent constructions included within the scope and spirit of the appended claims.

Turning now to FIGURE 1, there is shown a circuit diagram 10, partially in block form, of a preferred device for carrying out the teachings of the present invention. It includes a first pickup device 11 and a second pickup device 12. The first pickup device feeds in to a first channel generally indicated at 13, and the second pickup device supplies a channel 14.

Both of these channels are fed into a cathode ray tube 15 having a vertical deflection coil 16 and a horizontal deflection coil 17. In use, a standard magnetic element is inserted into the pickup device 12 and a sample magnetic element, which may, for example, be taken periodically from a production line, is inserted into the pickup device 11. The arrangement is such that the magnetic characteristics of the standard and of the sample are displayed for comparison purposes on the face of the cathode ray tube 15.

In accordance with one of the aspects of the invention, means are provided in the pickup units 11 and 12 for producing an output voltage which depends upon the change of flux due to the insertion of the magnetic element and in which the flux which passes through the air is effectively neutralized or cancelled out. To this end, each of the pickup units includes a pair of air-core transformers of substantially identical construction, but with the secondary windings connected in bucking relation so that the net output voltage in the absence of a magnetic element is zero. Taking the pickup unit 11 by way of example, it includes a first transformer 21 having a primary winding 22 and a secondary winding 23. The second air-core transformer, indicated at 25, includes a primary winding 26 and a secondary winding 27. In the case of the second pickup unit 12 the first transformer 31 has windings 32, 33 and the second transformer 35 has windings 36, 37.

For the purpose of integrating the output voltage of the pickup units, integrating voltage amplifiers 41, 42, respectively, are provided in the individual channels. The circuit of the integrating device 41, which will be taken as representative, is shown schematically in FIG. 2. Integration is accomplished by an RC network consisting of an input resistor 45 and a capacitor 46. In parallel with the capacitor 46 is a variable capacitor 46a for "trimming" purposes. A signal from the output of the RC network is fed into an amplifying tube 50 having conventional, bypassed dropping resistors 51, 52 for supplying the plate and screen elements respectively. The A.-C. component of the signal is applied to an output potentiometer 53 through a coupling capacitor 54. The slider of the potentiometer 53 enables adjustment of the output voltage at an output terminal 55.

For the purpose of reducing wave from distortion, stabilizing the operation and minimizing phase shift, the amplifier includes provision for applying a magnetic feedback voltage from output to input. In the present instance the voltage is taken from a feedback potentiometer 60 which is in parallel with the output potentiometer. The voltage from the potentiometer slider is coupled to the cathode of the tube 50 through a coupling transformer 61 having windings 62, 63. It will be apparent to one skilled in the art that using the above circuit the output voltage will be the mathematical integral of the input voltage. Since the circuit of the integrating device 42 is the same, the voltage in the second channel will also be integrated and will appear at the output terminal 65 thereof. In order to compensate for any slight phase shift which may occur in one of the integrators but not in the other, an auxiliary capacitor 66 may be employed in shunt with the output terminal of one or both of the integrating devices.

In carrying out the invention and to permit double display on the face of the cathode ray tube 15, a chopper switch 70 is employed. This switch is of the single-pole, double-throw type having a first input terminal 71, a second input terminal 72, and an output terminal 73. The output terminal is fed from a vibrating armature 74 in response to current flowing in an exciting winding 75 fed from the regular A.-C. line but preferably at reduced voltage.

In accordance with the present invention a cathode ray tube is provided having a pair of deflection coils arranged at right angles, with one of the coils being fed by a current which is proportional to the current flowing through the primary windings of the transformers of the pickup devices, and with the current in the second coil being proportional to the voltage received from the integrating devices 41, 42.

Reference will first be made to the means for feeding the deflection coil 17 coupled to the primary circuits in the pickup devices. For upright display of the hysteresis characteristic, the coil 17 is preferably the "horizontal" deflection coil. In carrying out the invention the primary coils are arranged in series with the deflection winding 17 and both are supplied with constant current by means of a constant current transformer 80. This constant current transformer is shown as having a primary winding 81 and a secondary winding 82. However, it will be appreciated by one skilled in the art that a commercial constant current transformer includes auxiliary circuitry for the purpose of insuring that the output current remains constant at a set value, irrespective of changes in loading, and any desired commercial unit may be used.

One advantage of using a constant current transformer is that the base line of the display is maintained at constant width under all conditions and when using magnetic elements of different size.

It may be noted in connection with the horizontal deflection coil circuit that since the primary windings and the "horizontal" deflection coil are in series, the currents which flow therein must at all times be precisely in phase, which contributes to the accuracy of the present device.

In order to insure that the current in the second or "vertical" deflection coil 16 is in phase with the integrated voltage, a power amplifier having negative current feedback is interposed between the vertical deflection coil and the switch 70. A pertinent portion of the circuit diagram of the power amplifier 90 is shown in FIG. 3. Here it will be noted that the input terminal feeds an input tube 91. Through associated circuitry, which is conventional and which therefore need not be described, the signal is fed from the input tube 91 to a pair of push-pull power output tubes 92, 93 having substantial power capability, i.e., capable for producing an output on the order of five watts or more. The plates of the tubes 92, 93 feed into an output transformer 95 having a primary winding 96 and a secondary winding 97. The latter winding is provided with output terminals 98 which are connected to the vertical deflection coil.

In carrying out the invention current feedback is provided from the secondary of the output transformer to the cathode of the input tube. This may conveniently be done by including in the secondary circuit a resistor in the form of a potentiometer 100 having a grounded slider 101, with the adjacent potentiometer terminal being connected to the cathode of the input tube by a series resistor 102 via a loop 103. The potentiometer 100 has a fairly low resistance, for example, in the order of 100 ohms. The voltage drop through the active leg of the potentiometer, which is proportional to the current flowing therein, is thus applied to the input of the power amplifier in the negative sense. The phase, as well as the magnitude of this voltage, are important, and the effect is to "force" the output current to be in phase with the input voltage notwithstanding the inductive reactance of the vertical deflection coil 16. The result is that the deflection coil becomes, in effect, a resistive load with the current flow therein in phase with the voltage at the input of the power amplifier. The lack of phase shift in the coil 16 contributes to the high inherent accuracy of the present device, and yokes having different inductance may be substituted incident to servicing the unit without changing the calibration or accuracy of the display.

It will be found, in employing the above circuit and teachings that two hysteresis curves 111, 112 are displayed in superimposed relation on the face of the cathode ray tube, one corresponding to the characteristic of the sample inserted in the pickup unit 11 and the other corresponding to the characteristic of the standard element inserted in the second pickup unit 12. The departure between the two characteristic curves may take many forms. Thus, the curves may be readily compared as regards the coordinates of their end points, slope, "fatness," curvature of "knee" portion, or the like. Where a display unit such as disclosed above is employed for periodic production line sampling, the limits of allowable departure may be drawn directly on the face of the tube and the operator may be instructed to alert his supervisor when any given sample exceeds these limits. From the nature of the departure of the sample from the standard, the engineers can ascertain what corrective steps to take in the production line manufacture in order to bring the magnetic characteristic back within the prescribed limits. The net effect is to insure that all production units will have operating characteristics within specified limits. In the case of rotors for clock motors, the device insures that adequate torque and proper synchronous characteristics will be maintained.

That the above arrangement produces an accurate representation of the hysteresis characteristic of a magnetic element may be verified by mathematical analysis. For this purpose a single one of the channels, for example channel 13, comprising a pickup unit, integrating device, and power amplifier may be taken as representative. The following symbols will be employed:

$L_{22}$ Inductance of 22
$L_{23}$ Inductance of 23
$L_{32}$ Inductance of 32
$L_{33}$ Inductance of 33
$I$ R.M.S. current in 22 and 32
$i$ Instantaneous current
$E_{23}$ Voltage induced in 23
$E_{33}$ Voltage induced in 33
$\phi_{21}$ Flux produced in 22 linking 23
$\phi_{31}$ Flux produced in 32 linking 33
$N$ Turns of wire on each primary winding
$a$ Area of air core
$A$ Cross section area of magnetic material under test
$\mu$ Permeability of material under test With no sample between 22 and 23 the conditions are:

$$E_{23} = -L_{23}\frac{d\phi_{21}}{dt}$$

and
$$E_{33} = -L_{33}\frac{d\phi_{31}}{dt}$$

but
$$\phi_{21} = 0.4\pi NIa$$
$$\phi_{31} = 0.4\pi NIa$$

therefore
$$E_{23} = -L_{23}(0.4\pi Na)\frac{di}{dt}$$

$$E_{33} = -L_{33}(0.4\pi Na)\frac{di}{dt}$$

Since windings 23 and 33 oppose each other,
$$E_{net} = E_{23} - E_{33} = 0$$

When a magnetic sample is placed between 22 and 23,
$$E_{23} = -L_{23}\frac{d\phi_{21}}{dt}$$

and
$$E_{33} = -L_{33}\frac{d\phi_{31}}{dt}$$

but
$$\phi = 0.4NI[(a-A) + A\mu]$$

thus
$$\phi_{21} = 0.4NI[a-A] + 0.4\pi NIA\mu$$

and
$$\phi_{31} = 0.4NIa$$

and
$$E_{23} = -L_{23}(0.4\pi N)(a-A)\frac{di}{dt} = L_{23}(0.4\pi N)(A\mu)\frac{di}{dt}$$

$$E_{33} = -L_{33}(0.4\pi N)(a)\frac{di}{dt}$$

but
$$L_{23} = L_{33}$$

therefore
$$E_{23} - E_{33} = -L_{23}(0.4\pi N)(A\mu - A)\frac{di}{dt}$$

and
$$E_{23} - E_{33} = -L_{23}(0.4\pi NA)(\mu - 1)\frac{di}{dt}$$

Since $\mu$ is relatively large compared with unity, the factor $(\mu - 1)$ may be approximated by $\mu$, the equation then becoming,
$$E_{net} = E_{23} - E_{33} = -L_{23}(0.4\pi NA\mu)\frac{di}{dt}$$

$E_{net}$ is put into the integrating amplifier and comes out as:
$$\int E_{net} = -L_{23}(.4NA\mu)i$$

For any given instant then, $\int E_{net}$ is proportional to the flux in magnetic material at that instance since
$$.4NI = H$$
$$\mu AH = \phi$$

It follows that the current applied to the vertical deflection coil is proportional to the instantaneous flux in the sample being tested. Since the current in the horizontal coil is proportional to the exciting current I, it follows from:
$$H = 0.4NI$$

that the horizontal deflection will be proportional to the instantaneous value of H. The combination of a vertical deflection proportional to the instantaneous value of $\phi$ for a corresponding value of H and a horizontal deflection proportional to the instantaneous value of H results in the B-H curve commonly known as a hysteresis loop. Because of the rapid switching produced by the chopper, two loops are displayed but it is understood that the derivation set forth above is independently applicable to each.

It is one of the features of the present device that the effect of the air coupling in the air core transformers is nullified so that the only effect producing indication at the face of the cathode ray tube is that of the sample itself. This is particularly important in the case of small elements where the amount of flux passing through the air in the absence of the element may exceed the increase in flux brought about by introducing the element into the magnetic circuit. Stated in other words, the present device produces an accurate hysteresis loop independently of the size of the magnetic sample or element being tested, provided only that the cross section area of the sample is the same as that of the standard. The cross section of the sample does determine the scale constant of the vertical axis, which must be determined for any given cross section in order to be used quantitatively. The sample need not form a closed magnetic loop, and simply inserting a part from regular production, regardless of shape, or a slug of the material to be tested, within the magnetic field of the air core transformers suffices.

While the device has been described in a preferred form permitting simultaneous display, the invention in one of its aspects may be employed using only one of the two channels, i.e., by closing the chopper switch 70 in one of its two positions to provide single display.

In the following claims the term "two-axis display device" is intended as a generic term to cover devices capable of making a trace relative to rectangular axes in response to signals received at corresponding input terminals.

I claim as my invention:

1. In a device for displaying for comparison the hysteresis characteristics of two magnetic elements, the combination comprising first and second pick-up devices each having an air core transformer having a primary winding and a secondary winding with provision for inserting the respective magnetic elements therein thereby to change the flux coupling the transformer secondary windings, a source of alternating current for supplying said primary windings, first and second integrating devices coupled to said pick-up units, a cathode ray tube having first and second deflection coils, said first deflection coil being connected in series with said primary windings, power amplifier means for feeding the second deflection coil, said power amplifier having a current feedback loop included therein so that the current through said second deflection coil is maintained in phase with the voltage at the amplifier input notwithstanding the inductance of the connected deflection coil, and a double throw chopper switch interposed between said integrating devices and said power amplifier so that the hysteresis characteristics of the magnetic elements are displayed superimposed on the face of said cathode ray tube.

2. In a device for displaying for comparison the magnetic characteristics of two magnetic elements, the combination comprising first and second pickup devices each having an air core winding and means for exciting the same with alternating current, said windings including provision for inserting the respective magnetic elements into the magnetic fields thereof thereby to change the flux and said pickup devices being so constructed and arranged that output signals are produced depending upon the change in flux, first and second integrating devices coupled to said pickup units, a cathode ray tube having first and second deflection coils, means for supplying the first deflection coil with predetermined alternating current, a power amplifier for feeding the second deflection coil, said power amplifier including means for maintaining the output current thereof in predetermined phase relation with the voltage at the amplifier input notwithstanding the inductance of the connected deflection coil, and a double-throw chopper switch interposed between said integrating devices and said power amplifier so that the magnetic characteristics of the magnetic elements are displayed superimposed on the face of said cathode ray tube.

3. In a device for displaying for comparison the hysteresis characteristics of two magnetic elements, the combination comprising first and second pickup devices each having an air core transformer having a primary winding and a secondary winding with provision for inserting the respective magnetic elements therein thereby to change the flux coupling the transformer secondary windings, a source of predetermined current for supplying the primary windings, first and second integrating devices coupled to said pickup units, a cathode ray tube having first and second deflection means, means for supplying the first deflection means with a signal corresponding to the magnitude of the primary current, and a double-throw chopper switch interposed between said integrating devices and said second deflection means so that the hysteresis characteristics of the magnetic elements are displayed superimposed on the face of said cathode ray tube.

4. In a device for displaying for comparison the hysteresis characteristics of two magnetic elements, the combination comprising first and second pickup devices each having a pair of air core transformers having primary windings and secondary windings and with the secondaries connected in bucking relation, one of the transformers in each pair having provision for inserting a respective magnetic element therein to unbalance the voltages in the connected secondary windings and for production of a net output voltage, a source of predetermined current for supplying the primary windings, first and second integrating devices coupled to said pickup units, a cathode ray tube having first and second deflection means, means for supplying the first deflection means with a signal corresponding to the magnitude of the primary current, and a double-throw chopper switch interposed between said integrating devices and said second deflection means so that the hysteresis characteristics of the magnetic elements are displayed superimposed on the face of said cathode ray tube.

5. In a device for displaying the hysteresis characteristic of a magnetic element, the combination comprising a pickup device including an air core transformer with provision for inserting the magnetic element into the magnetic circuit thereof and so constructed and arranged that a voltage is produced at the output of the pickup device which is a measure of the change in flux caused by the introduction of the element, voltage integrating means coupled to the output of said pickup device, a cathode ray tube having first and second deflection coils, means for supplying predetermined current to the primary of said air core transformer and to the first deflection coil, a power amplifier interposed between said integrating means and said second deflection coil, said power amplifier including negative current feedback means so that the current in said second deflection coil remains substantially in phase with the voltage from said integrating means notwithstanding the inductance of said second deflection coil.

6. In a device for displaying the hysteresis characteristic of a magnetic element, the combination comprising a pickup device including a pair of air core transformers with their primaries connected in series and with their secondaries connected in bucking relation, one of said transformers having provision for inserting the magnetic element into the magnetic circuit thereof so that a voltage is produced at the output of the pickup device which is a measure of the change in flux caused by the introduction of the element, voltage integrating means coupled to the output of said pickup device, a cathode ray tube having first and second deflection coils, a constant current transformer for supplying predetermined current to the primaries of said air core transformers and to the first deflection coil with the latter connected in series, a power amplifier interposed between said integrating means and said second deflection coil, said power amplifier including negative current feedback means so that the current in said second deflection coil remains substantially in phase with the voltage from said integrating means notwithstanding the inductance of said second deflection coil.

7. In a device for comparing the hysteresis characteristics of a magnetic sample and a magnetic standard, the combination comprising a first pickup unit having a pair of air core transformers with the secondaries connected in bucking relation, a first integrating voltage amplifier for integrating and amplifying the net output voltage of the first pickup unit, a second pickup unit having a pair of air core transformers with their secondaries connected in bucking relation, a second integrating voltage amplifier for integrating and amplifying the net output voltage of the second pickup unit, a two-axis display device having horizontal and vertical input terminals, a double-throw signal chopper having its input connected to said amplifiers and its output connected to one of the terminals of said display device, means for energizing with equal current the primary windings of said air core transformers, the remaining terminal of said display device being coupled to said current source, and means for permitting insertion of magnetic elements in one of the air core transformers of each of said pickup units for simultaneous display on said display device of the hysteresis curves characteristic of the respective magnetic elements.

References Cited in the file of this patent

UNITED STATES PATENTS

| 2,283,742 | Leonard | May 19, 1942 |
| 2,594,947 | Lynch | Apr. 29, 1952 |
| 2,610,230 | Wiegand | Sept. 9, 1952 |
| 2,616,948 | Cannon | Nov. 4, 1952 |
| 2,830,262 | Lord | Apr. 8, 1958 |

OTHER REFERENCES

Crittenden et al.: The Review of Scientific Instruments, December 1951, pp. 872–877.